United States Patent
Loui et al.

(10) Patent No.: US 7,598,624 B2
(45) Date of Patent: Oct. 6, 2009

(54) MARINE WAVE ENERGY CONVERSION SYSTEM

(75) Inventors: Steven Loui, Honolulu, HI (US); Gary Shimozono, Kapolei, HI (US)

(73) Assignee: Navatek, Ltd., Honolulu, HI (US)

( * ) Notice: Subject to any disclaimer, the term of this patent is extended or adjusted under 35 U.S.C. 154(b) by 0 days.

(21) Appl. No.: 12/257,585

(22) Filed: Oct. 24, 2008

(65) Prior Publication Data
US 2009/0039654 A1    Feb. 12, 2009

Related U.S. Application Data

(62) Division of application No. 11/955,469, filed on Dec. 13, 2007, now Pat. No. 7,459,802.

(60) Provisional application No. 60/874,956, filed on Dec. 15, 2006.

(51) Int. Cl.
    *F03B 13/10* (2006.01)
(52) U.S. Cl. .............................. 290/42; 290/43; 290/54; 290/53
(58) Field of Classification Search .................. 290/53, 290/42, 43, 54
    See application file for complete search history.

(56) References Cited

U.S. PATENT DOCUMENTS

| 3,546,473 A | 12/1970 | Rich | 290/42 |
|---|---|---|---|
| 3,991,837 A | 11/1976 | Crickmer | 175/27 |
| 4,389,843 A | 6/1983 | Lamberti | 60/507 |
| 4,914,915 A | 4/1990 | Linderfelt | 60/502 |
| 5,347,186 A | 9/1994 | Konotchick | 310/17 |
| 6,392,314 B1 | 5/2002 | Dick | 290/53 |
| 6,857,266 B2 | 2/2005 | Dick | 60/496 |
| 6,864,592 B1 | 3/2005 | Kelly | 290/52 |
| 6,933,623 B2 | 8/2005 | Carroll et al. | 290/42 |
| 7,245,041 B1* | 7/2007 | Olson | 290/53 |
| 7,298,054 B2* | 11/2007 | Hirsch | 290/42 |
| 2004/0163389 A1 | 8/2004 | Gerber et al. | 60/295 |

* cited by examiner

*Primary Examiner*—Nicholas Ponomarenko
*Assistant Examiner*—Iraj A Mohandesi
(74) *Attorney, Agent, or Firm*—Fitzpatrick, Cella, Harper & Scinto

(57) ABSTRACT

An energy conversion system includes a first mechanical system for converting reciprocating motion to rotary motion, a second system formed of belts and pulleys connected to said first system and driven by said rotary motion to lift a weight in response to said rotary motion from a first position to a second position and allow the weight to return to said first position under the influence of gravity. A rotary electrical is driven by the second system through a transmission means connected to the second system to create electricity only while the weight is returning from its second to its first position.

25 Claims, 8 Drawing Sheets

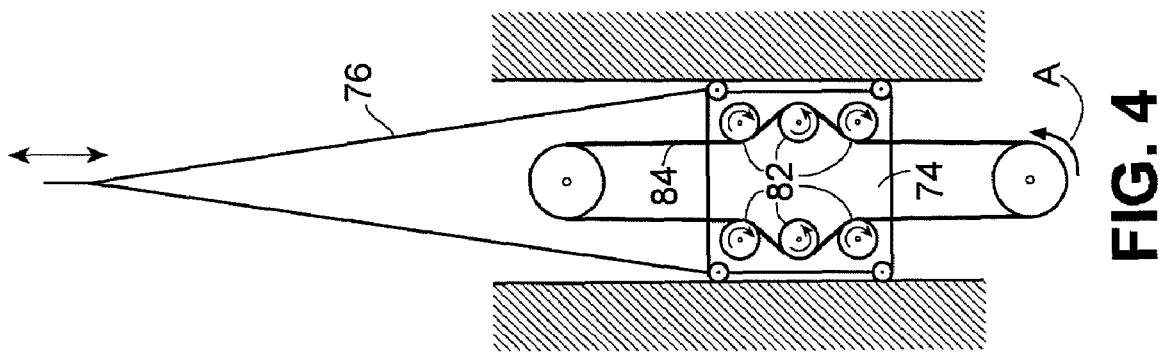
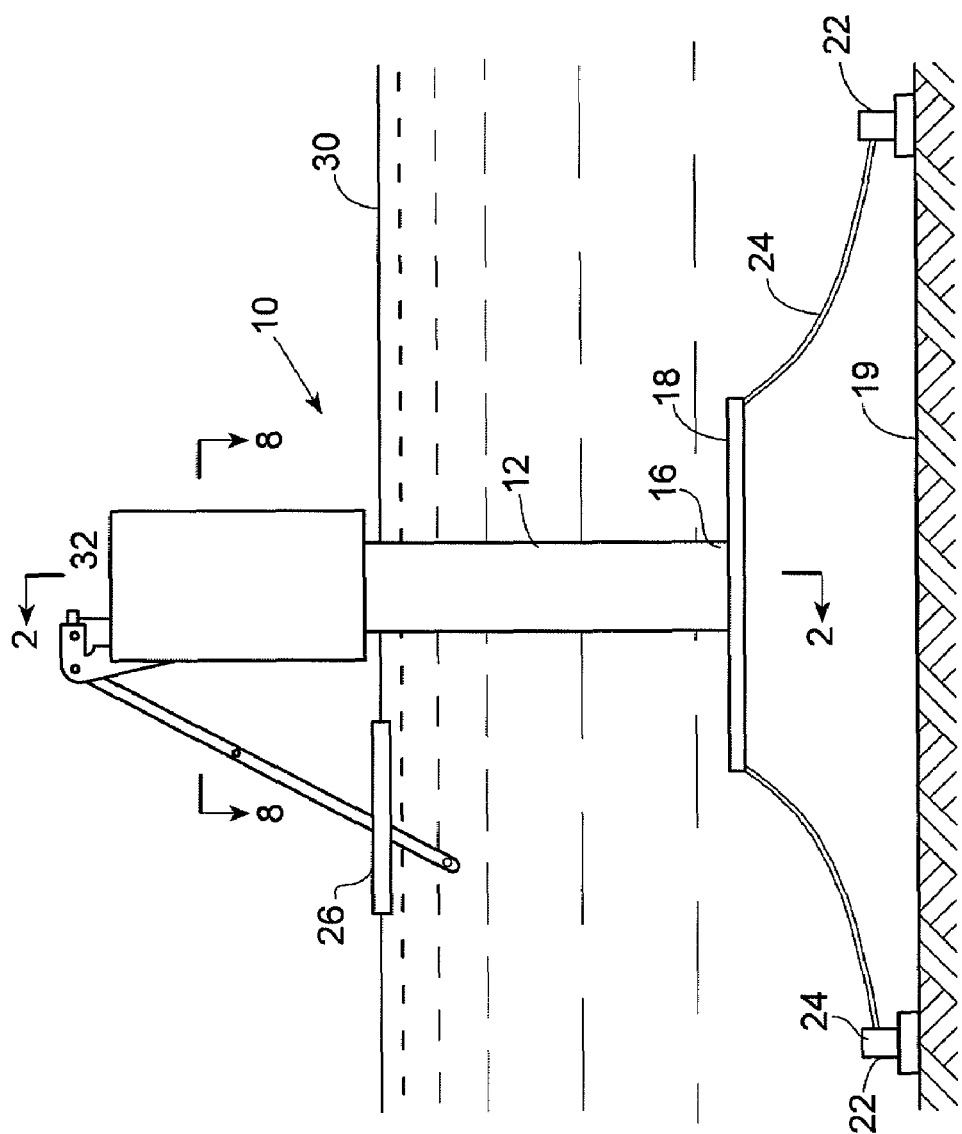

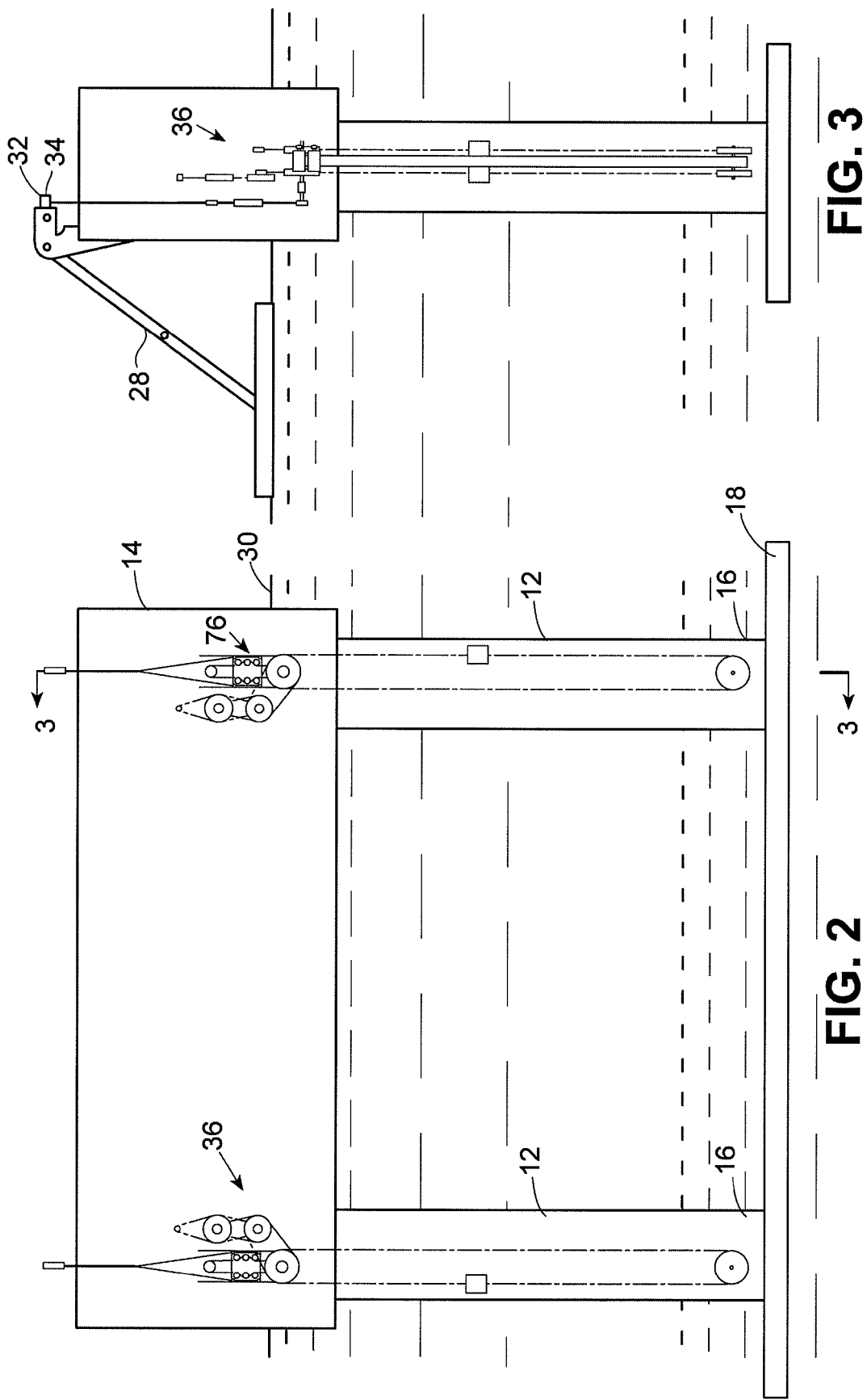

MARINE WAVE ENERGY CONVERSION SYSTEM

BACKGROUND OF THE INVENTION

This application is based on and claims the benefit of Provisional Application No. 60/874,956 filed Dec. 15, 2006 and is a divisional of U.S. patent application Ser. No. 11/955,469 filed Dec. 13, 2007, the disclosures of each of which are incorporated herein by reference.

FIELD OF THE INVENTION

The present invention relates to the development of electrical power from mechanical energy produced from waves or other sources of motion.

The conversion of mechanical energy into electrical power is of great interest today given the costs of petrochemical fuels and the recent dramatic increase in energy demands by developing nations. One particular source of such alternative energy which has attracted substantial interest is the conversion of ocean wave energy into electrical power.

Many different forms of wave energy conversion devices have been proposed, which involve direct conversion of vertical wave motion to electrical energy using turbines, mechanical connections and even metal coil windings as disclosed for example in U.S. Pat. Nos. 4,389,843; 4,914,915; 6,857,266; 3,546,473; and 6,864,592.

Most of the prior art wave conversion devices are designed to require persistent high amplitude wave energy. However it is difficult to find areas in which there is a prevalence of high ocean wave activity with sufficient energy to allow most such devices to operate efficiently. And, such areas often are located in the remotest portions of the oceans.

Other of such systems use direct coupled generators that suffer reduced efficiencies due to speed variations at the generator during wave cycles. Still others operate at subsurface levels using the head differential of waves to generate power or complex pumping or pressurization of secondary fluids to turn generators.

Accordingly there has been a long need for a system that can be effective through a wide range of energy conditions, including those for which existing systems are inefficient.

OBJECTS OF THE INVENTION

It is an object of the invention to convert energy from moving water, i.e., wave energy and energy from water surges to electrical energy through direct mechanical conversion.

Another object of the invention is to convert wave energy to electrical energy through a mechanical conversion system which applies constant torque and shaft speed to an electrical generator during the power stroke.

Another object of the invention is to reduce power losses in the conversion of wave energy to electrical energy by first converting wave energy to potential energy and then recovering that energy by mechanically driving a generator at a constant speed.

Yet another object of the invention is to extract energy from sea waves at the water surface where the energy density is the greatest.

A further object of the present invention is to utilize a mechanically simple device to convert wave action into electrical energy without the use of linear generators or complex control systems.

A still further object of the present invention is to convert wave energy into electrical energy using a mechanical conversion system which is simple and inexpensive to manufacture, assemble and maintain.

SUMMARY OF THE INVENTION

In accordance with one aspect of the present invention a device for converting wave energy to electrical energy includes a first vertically arrayed continuous belt or chain moving about upper and lower pulleys or sprockets and having one or more heavy weights secured thereto. One of the pulleys or sprockets is driven in one predetermined direction by a second belt or chain which is engaged with a series of one way gear sprockets or pulleys that are moved relative to the second belt by a mechanical linkage arranged to reciprocate in response to wave motions.

The first belt or chain is also engaged through a transmission system to an electrical generator so that movement of the first belt drives the generator. By this arrangement when the weights on the first belt are moving downwardly under the influence of gravity the falling weights deliver a constant torque and speed at constant load to the generator.

The one way gears or pulleys connected to the second chain consist of at least one pair of oppositely acting one way sprockets each being engaged with different sides of the belt or chain and arranged to drive the belt in the same direction. These sprockets are mounted on a carriage which can be moved relative to the second belt by a mechanical arm connected at one end to the carriage and at its other to a float on the surface of the body of water on which the system is deployed.

By this arrangement one of the one way gear sprockets engages the chain belt to drive it when the sprocket carriage is moved upwardly and the other one way gear sprocket will move the second chain belt in the same direction when the carriage is moved downwardly. In this way the first chain belt carrying the weights is always driven in the same direction, regardless of the direction of motion of the carriage. The gearing of these one way sprockets is such that the chain belt is moved even in low wave or water surge heights which produce only limited vertical travel or amplitude of movement of the carriage.

The above and other features, objects and advantages of the present invention will be apparent to those skilled in the art from the following detailed description of the illustrative embodiments thereof when read in connection with the accompanying drawing wherein:

BRIEF DESCRIPTION OF THE DRAWINGS

FIG. 1 is an elevational view of a Marine Wave Energy Conversion System constructed in accordance with the present invention;

FIG. 2 is a side sectional view of the device shown in FIG. 1, taken along lines 2-2 of FIG. 1, with the internal mechanism shown schematically;

FIG. 3 is a sectional view taken along line 3-3 of FIG. 2, again with the internal mechanism shown schematically;

FIG. 4 is an enlarged schematic view of a portion of the energy conversion system shown in FIG. 2;

DETAILED DESCRIPTION OF THE INVENTION

Figure 5:
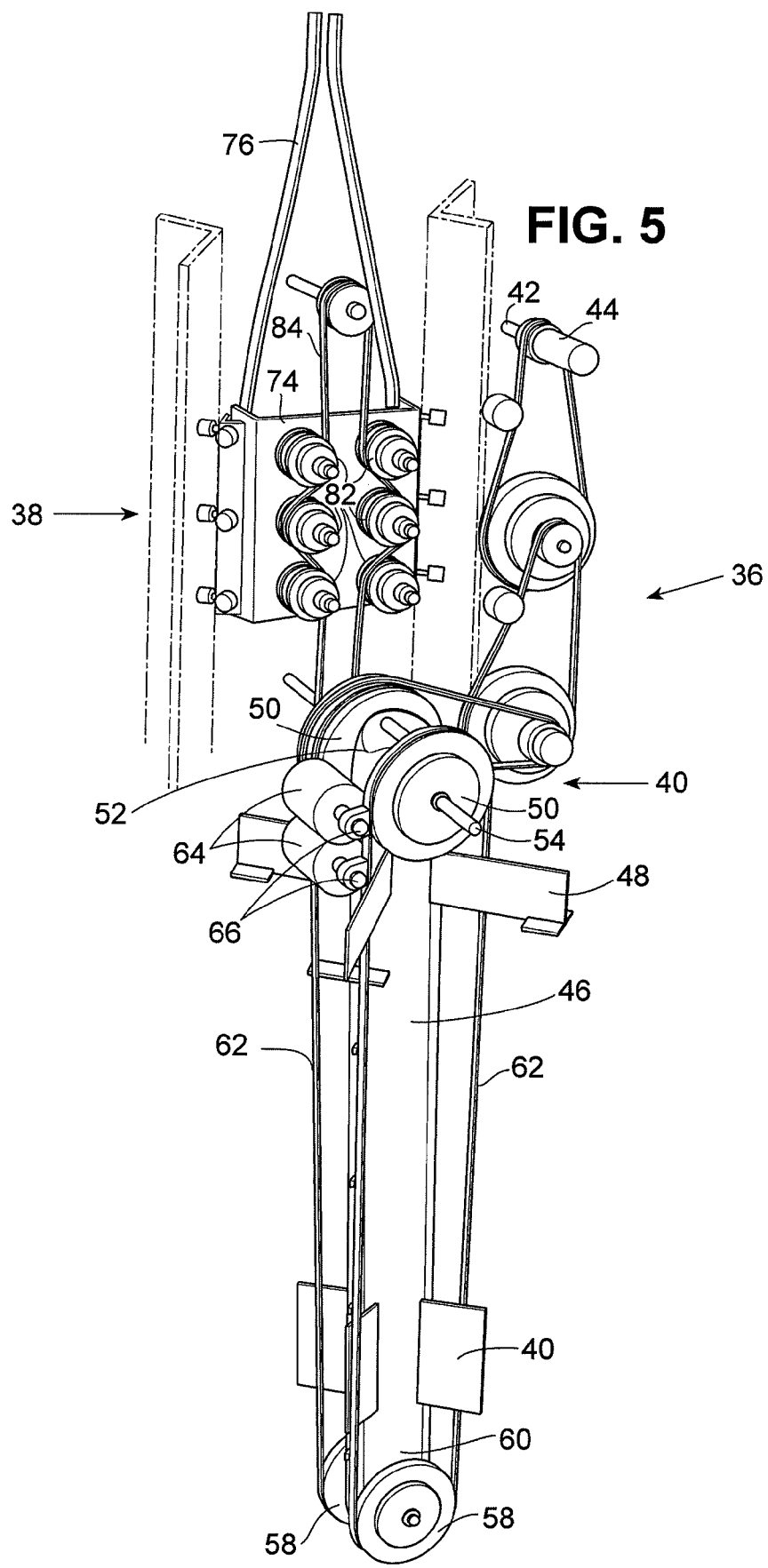
FIG. 5 is an enlarged perspective view of mechanical conversion system and power take off mechanism shown in FIG. 5.

Referring now to the drawings in detail, and initially to FIGS. 1 and 2 a marine wave conversion system 10 is illustrated which is adapted to convert ocean wave energy to electrical power. However, the conversion mechanism itself can be used with sources of power or movement other than ocean waves for the same purpose of converting motion to electrical power.

In the illustrative embodiment the system 10 includes a pair of submersible towers 12 which enter into and support an upper housing 14. The towers 12 are of substantially identical construction, being hollow members, connected at their bottoms 16 to a base 18 which may include a plurality of ballast chambers (not shown).

The system 10 is illustrated in place in a body of water, like an ocean or large lake. It is secured to the sea bed 19 by anchors 22 and cables 24 in any convenient or known manner so that, with the appropriate ballast the tower 12 and the housing 14 mounted thereon can heave and pitch relative to the surface float 26 described hereinafter. By proper tuning using ballast and the like as would be apparent to those skilled in the art, the tower and housing assembly can have a different frequency in the wave spectrum as compared to float 26 to provide an increased response over a broader frequency band.

Although the illustrative embodiment utilizes two towers and their associated internal conversion systems described below, it is to be understood that the invention contemplates the use of either one tower or more than two towers as well.

The system 10 includes a water surface float 26 connected to a pair of pivot arms 28 (see FIG. 7) pivotally mounted on housing 14 as described hereinafter. Wave motion causes the float 26 to rise and fall on the waves relative to housing 14 and towers 12. (Cf. the water lines 30 of FIGS. 1 and 2, which causes the arms 28 to pivot on housing 14.) An inner arm or extension 32 of arm 28 shown schematically in FIG. 3 is therefore also caused to pivot on the housing, moving its free end 34 up and down with the passage of the waves.

The inner end 34 of arm 32 is connected as described hereinafter to a transmission system 36 which converts the up and down movement of arm 32 to rotary motion to drive an electric generator for the production of electricity.

Figure 6:
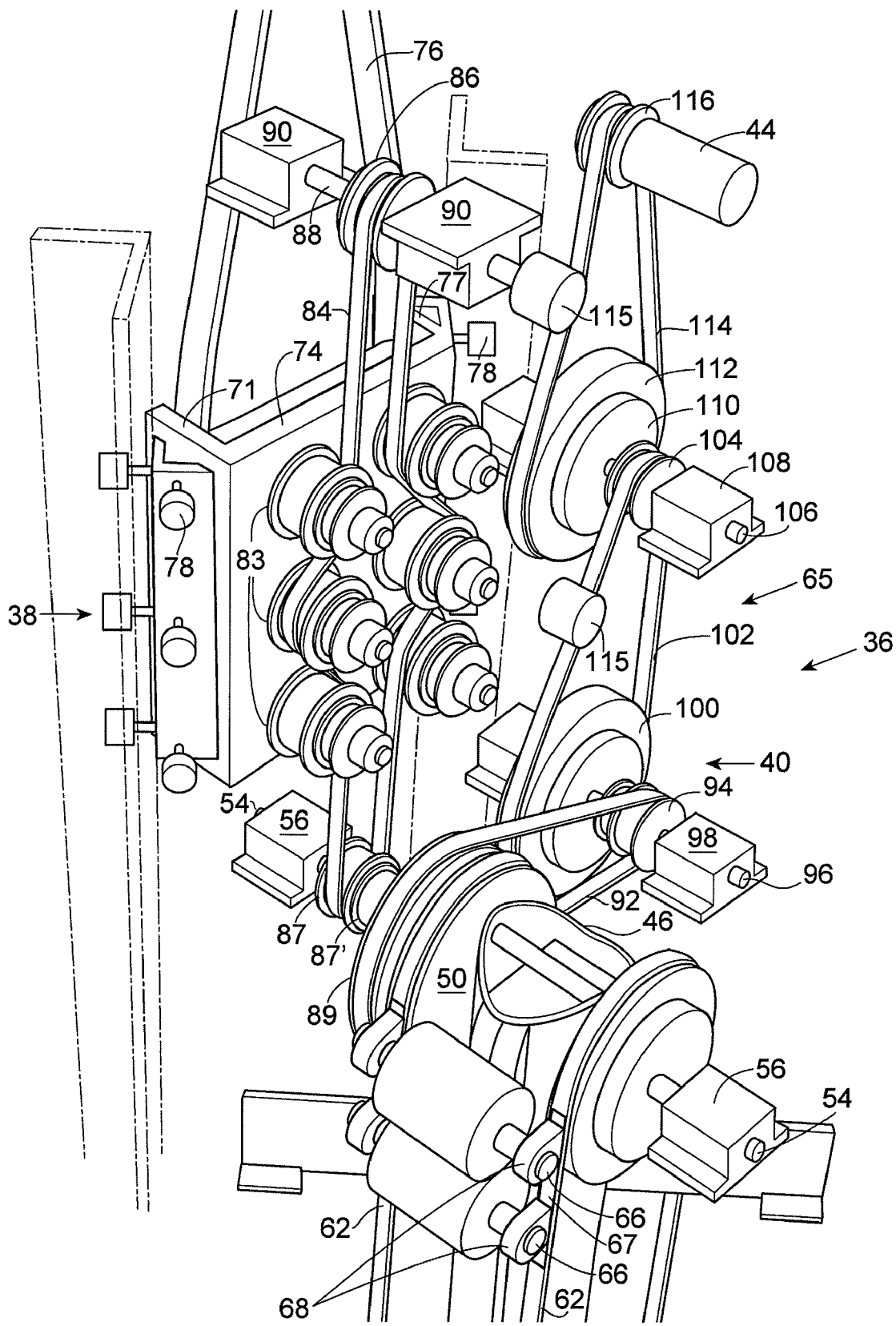
FIG. 6 is a further enlarged perspective and more detailed view of a portion of the power take off mechanism shown in FIG. 5.

Transmission system 36 is shown in greater detail in FIGS. 5 and 6. The systems in each tower 12 are identical so only one is described. As shown in FIG. 2 the two systems 36 are illustrated in mirror image positions, but they could be positioned in the same relative positions if desired.

Transmission system 36 consists of two main subsystems. The first is a carriage system and clutch assembly 38 for converting the reciprocal movement of arms 32 to linear movement of a drive belt. The second is a generator drive transmission 40. Both the carriage assembly 38 and transmission 40 utilize chain and sprocket or belt and pulley systems drives as desired. While the systems shown in the drawings are belts and pulleys they could be chains and sprockets. Accordingly applicant refers herein to these elements as belt/chain, pulley/sprocket, belt or chain, pulley or sprocket interchangeably.

Generator drive system 40 is driven by the carriage system 38 as described hereinafter to drive the input shaft 42 of a rotary electric power generator 44. The system includes a central support tube 46 which is supported within its associated tower 12 by a plurality of flanges 48 which extend radially outwardly. The outer ends of these flanges are secured, by welding or the like, to the inner surface of the tower 12. Other structures for supporting the weights and carriage can also be used.

A pair of pulleys/sprockets 50 are supported at the upper end 52 of tube 46 on a shaft 54 mounted in bearing blocks 56. Those bearing blocks are mounted in the tower 12 in any conventional manner as would be apparent to one skilled in the art.

A lower pair of pulleys/sprockets 58 are mounted for rotation on the lower end 60 of tube 46, again in any convenient manner, below and in vertical alignment with pulley/sprockets 50. A pair of belts/chains 62 are engaged over the pairs of aligned pulleys/sprocket 50, 58, as shown. These belts support one or more relatively heavy weights 64. These weights are shown in the illustrative embodiment as cylindrical members having end shafts 66 mounted in bearing blocks 68 secured in any convenient manner to the belts 62. For example in the case where the belt/chain is a belt, the bearing blocks may be secured to a flexible strip 67 secured to the belt by appropriate adhesives, stitchings or the like.

As described hereinafter the reciprocation of carriage 38 drives the belts/chains 62 of transmission 40 in the counterclockwise direction as shown in FIGS. 5 and 6, lifting the weights to and over the top of tube 46, at that point the weights 64 drive the belts 62 as they "fall" downwardly under the influence of gravity. This motion is transmitted through a subtransmission 65 to drive generator 44.

Figure 9:
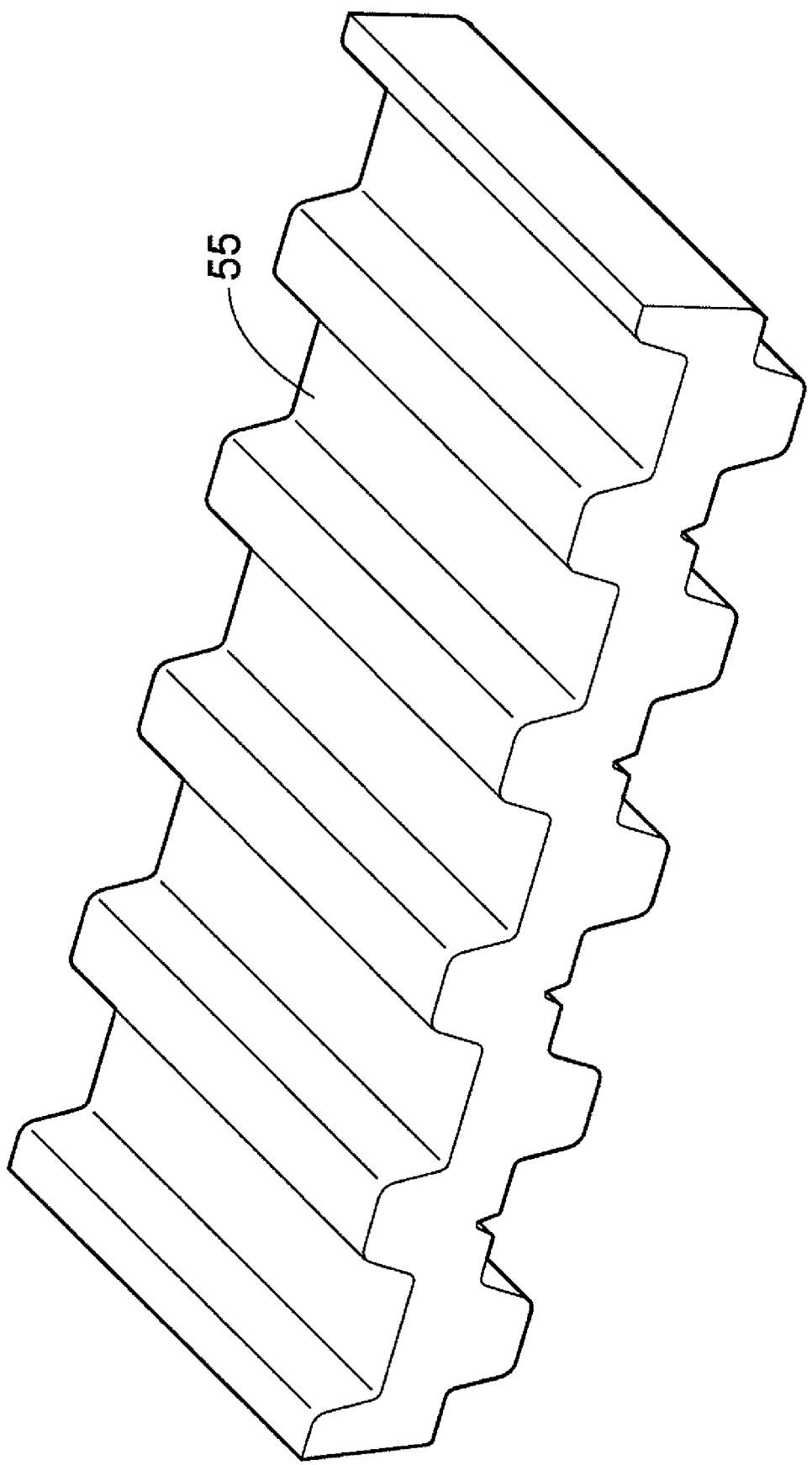
FIG. 9 is a perspective view of a preferred form of drive belt used in the system shown in FIGS. 1-8.

In a preferred embodiment the various belts used in the system of the present invention are so-called duplex belts as shown in FIG. 9 which have molded teeth on both sides for mating with corresponding teeth on their associated pulleys.

Figure 8:
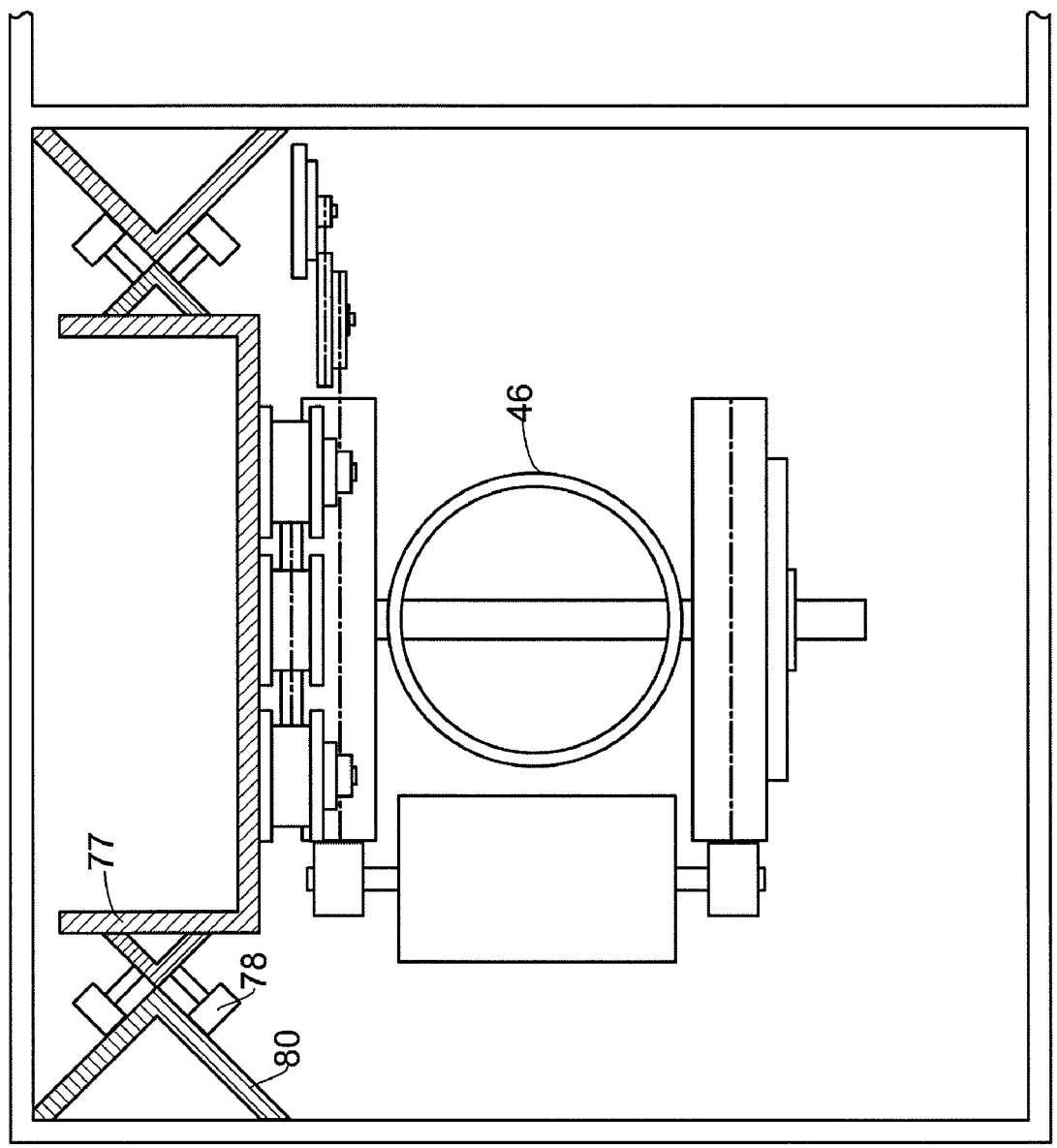
FIG. 8 is a top view taken along line 8-8 of FIG. 1.

Carriage system and clutch assembly 38 consists of a frame 74 rigidly connected to a yoke or other means of suspension 76 whose upper end is connected to the end 34 of arm extension 32. Frame 74 has sides 77 on which a plurality of guide rollers 78 are mounted in pairs at 90° to each other. These guide rollers engage right angle guide tracks 80 (See FIG. 8) mounted on the walls of the upper housing 14, so that as the carriage reciprocates in the vertical direction in response to wave action it is guided in a fixed vertical plane in order to ensure that the various belt/pulley contact points described below remain in alignment. This structure also is simply illustrative of a particular embodiment for guiding the carriage.

In the illustrative embodiment of the invention three pairs of pulley/sprockets 82 that include one way clutches, e.g., sprag clutches, are mounted on carriage 74 so that the pulley/sprockets can engage and drive an associated belt 84 in one direction and free wheel in the opposite direction. As shown by the arrows in FIG. 4, the upper and lower pairs of one way pulley/sprockets 82 are set to drive the belt 84 when they rotate in the clockwise direction and free wheel when they rotate in the counter clockwise direction. The middle pair of one way pulleys/sprockets are set to drive belt/chain 84 when they rotate counterclockwise and free wheel when they rotate clockwise.

Belt 84 is trained through one way pulleys/sprockets 82 on frame 74 as shown and also engages upper and lower pulley/sprockets 86, 87. Sprocket 86 is mounted for rotation on a shaft 88 which is supported on bearing blocks 90 mounted in a fixed position in housing 14 in any convenient manner above pulley/sprockets 82. Lower sprocket 87 is similarly rotatably mounted on a shaft 54 supported in one of the bearing blocks 56. Sprocket 87 is fixed to an overrunning clutch 87' secured to shaft 54 so that movement of belt 84 will drive sprocket 87 and clutch 87'. The latter is connected to a pulley/sprocket 89 which is fixed to the adjacent pulley sprocket 50. As a result reciprocal movement of carriage 74 relative to belt 84 will cause the belt always to be driven in a counterclockwise direction, thereby driving pulley/sprockets 50 and belts 62 until the weights 62 pass over the top of pulleys/sprockets 50 at which point the overrunning clutch releases under the force of the weights so the clutch free wheels and the weights can "fall," continuing to drive belts 62 until they reach the bottom pulley 58 and clutch 87' reengages.

As will be apparent from FIG. 4 when carriage 74 is moved upwardly as a result of downward movement of float 26 belt 84 will move in the direction of arrow A since the middle pair of one way pulley/sprockets are engaged thereby driving the belt in the direction while the upper and lower pairs of one way pulley/sprockets free wheel.

Conversely when carriage 74 moves downwardly as a result of upward movement of float 26 the upper and lower pair of sprockets 82 as seen in FIG. 4 engage to continue to drive belt 84 in the same direction, while the middle pair of pulley sprockets freewheel. As a result pulley/sprocket 87 is continuously driven to rotate pulley/sprockets 50.

Preferably the belt 84 can be a called "duplex" belt 55 as seen in FIG. 9 having teeth molded therein on both sides to engage corresponding teeth on the sprockets/pulleys 82.

A third belt/chain 92 drivingly connects system 40 to transmission system 65. Belt/chain 92 is trained about the pulley/sprocket 89 secured to the adjacent pulley/sprocket 50 for rotation therewith. The belt 92 is also trained over a pulley/sprocket 94 mounted on a shaft 96 supported in bearing blocks 98. A second larger pulley/sprocket 100 is also secured to shaft 96 to drive a belt/chain 102 which is trained over a smaller pulley/sprocket 104 fixed to a shaft 106 supported in bearing blocks 108.

Shaft 106 is connected to a large pulley/sprocket 112 and a belt/chain 114 is trained over pulley/sprocket 112 and a drive pulley/sprocket 116. The belts/chains 102, 114 have tensioning rollers or sprockets 115 associated with them and mounted in housing 14 in any convenient manner. A centrifugal clutch 110 is engaged between sprocket 116 and generator 44 on generator shaft 42. The clutch is preferably located in the position where the highest shaft speeds are developed but could be located elsewhere in the drive train.

As a result of this construction when the weights 62 begin to free fall after passing over the tops of pulleys 50 the overrun clutch 87' disengages and the centrifugal clutch 110 engages once a predetermined shaft speed is achieved in pulley 116. At that point transmission 65 acts as a step up transmission driving the shaft of generator 44 at the desired efficient speed to produce electricity which is transmitted to a grid or storage facility through power lines (not shown).

While the weights are falling movement of carriage 74 has no effect on the belts/chains 62 because of the overrunning clutch 87'. Electricity therefore is produced only on descent of the weights. While the weights fall solely under the influence of gravity (thereby using the potential energy stored in them from the wave activity which raised them) they fall at a constant speed related to the torque and shaft speed required by the generator. The amount of torque developed by the weights is a function of the various pulley/sprocket diameters, step up rates of the transmission and the generator's requirements.

Figure 7:
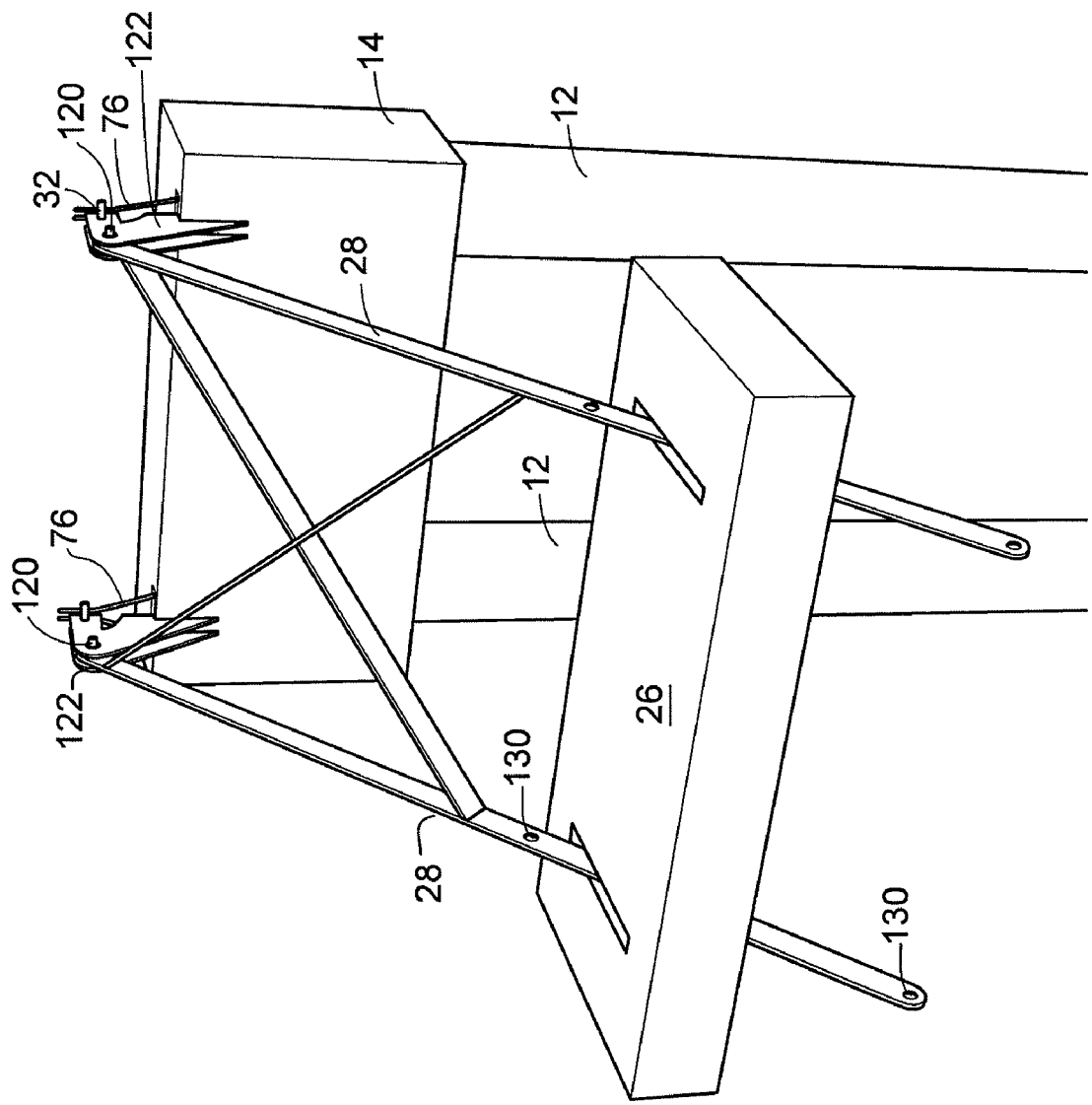
FIG. 7 is a front perspective view of the apparatus of FIG. 1 showing one embodiment of the float arrangement.

FIG. 7 shows one embodiment for connecting the float to the pivot arms 28 and yokes 76. In the illustrative embodiment a pair of arms 28 is provided which are pivotally mounted on pins 120 supported between pairs of flanges 122 on housing 14. The arms 28 have extensions 32 as noted above which extend between flanges 122 in each pair and are pivotally connected to the top of yoke 76. Yoke 76 may be pivotally connected to carriage 74 so that its two pivotal connections accommodate the arcuate movement of extension 32 while the carriage is restrained to vertical movement. Alternatively other flexible connections known in the art to accommodate such movements may be used.

As seen in FIG. 7 the float 26 can be connected to arms 28 at various points to adjust the amount of movement of the arm created by wave action. In the illustrated embodiment three sets of pivot holes 130 are provided in each arm, only two of which are seen in the drawing. The third set in this case is located within float 26 to pivotally connect the arms to the float in the intermediate of the three positions.

It is a significant characteristic of the disclosed embodiment of the invention that only relatively small vertical motion of the frame or carriage 74 is necessary to cause motion in belts/chains 62; thus wave motion or water surges sufficient to cause the pulley/chain to move by only one tooth on the one way or sprag clutches will be enough to cause the chains 62 to move to lift weights 64 and store potential energy. This characteristic is particularly important in circumstances in which there is wide variation in amplitude of the motion of the lever arm 28. However, significant power generation occurs when the weights 64 fall and release their potential energy to drive belt/chains 62 and operate the generator.

It must be noted that the illustrations of the invention herein are not to scale and that, for example, the height to width of the carriage 74 would be much greater than represented in the drawing in order to maximize the length of vertical travel of the one way pulley/sprockets 82.

Figure 10:
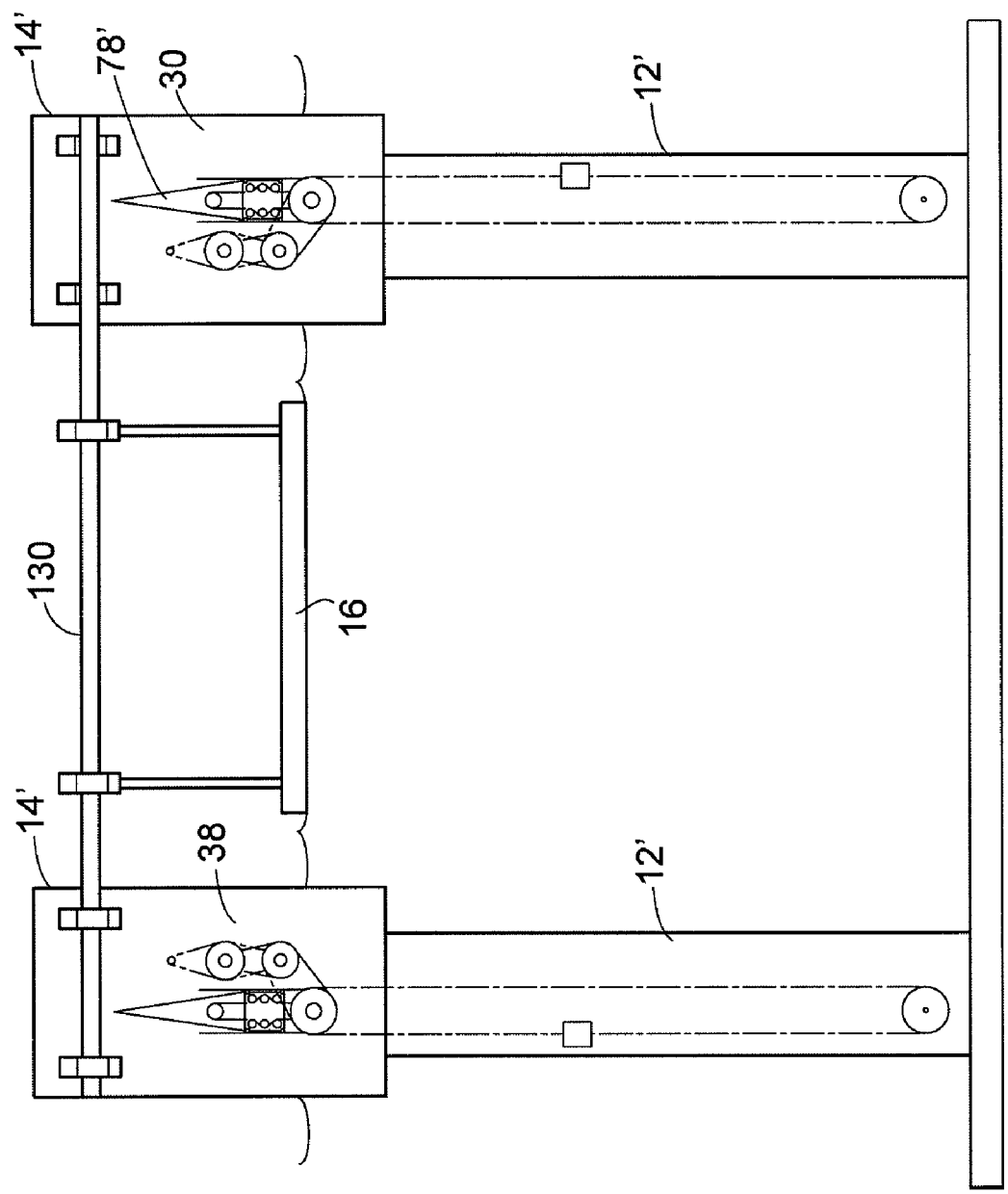
FIG. 10 is a view similar to FIG. 2 of another embodiment of the invention.

FIG. 10 illustrates another embodiment of the invention wherein the carriage assemblies associated with towers 12' are enclosed within separate housing 14'. A single float 26' is provided between towers 12' and connected to arms 28' which are fixed to a shaft 130. That shaft is rotatably mounted in bearings 132 in the respective housings 14' and has extension arms (not shown) fixed to it and secured to yokes 78' to reciprocate carriage assembly 38.

In addition, in this embodiment, instead of using the additional pulley/sprocket 90 and belt 92, the belt/chains 62 are shown to be extended to engage the pulley/sprocket 94 and drive it directly. Of course where two belt chains 62 are used as in the embodiment of FIG. 6, they would be two pulley/sprockets 94, one for each belt/chain 62 mounted on shaft 96 to drive pulley/sprocket 100.

In addition, using the arrangement shown in FIG. 10, more than one energy conversion system 36 can be located on each tower 12' and housing 14'.

While the above described embodiment is particularly adapted to the use of ocean waves to drive the carriage 74, those skilled in the art would appreciate that the system could be readily adapted to other sources of power input. One such example would be a windmill used to drive a cranking mechanism to raise and lower the carriage assembly, or even a manually operated cranking assembly for emergency power.

Although the invention has been described herein with reference to the specific embodiments shown in the drawings it is to be understood that the invention is not limited to such embodiments and that various changes and modifications may be effected therein without departing from the scope or spirit of the invention.

What is claimed is:

1. An energy conversion system comprising first means for converting reciprocating motion to rotary motion, second means connected to said first means and driven by said rotary motion for lifting a weight in response to said rotary motion from a first position to a second position and for allowing said weight to return to said first position under the influence of gravity, a rotary electrical generator, and transmission means connected to said second means for driving said rotary electrical generator to create electricity only while said weight is returning from said second to said first position.

2. An energy conversion system as defined in claim 1 wherein said second means includes means for preventing transfer of rotary motion from the first means to the second means while said weight returns from its second position to its first position.

3. An energy conversion system as defined in claim 2 wherein said first means includes a carriage, means for moving said carriage in a reciprocating path of travel; a pair of spaced pulleys/sprockets respectively located adjacent the opposed ends of the path of travel of said carriage, an endless belt/chain engaged with said pulleys/sprockets and a plurality of one way drive means on said carriage and engaged with said endless belt to drive the belt in a single drive direction regardless of the direction in which the carriage is reciprocating.

4. An energy conversion system as defined in claim 3 wherein said one way drive means comprise one way mechanical drives which engage to drive the belt/chain in one predetermined direction and free wheel in the other, said one way mechanical drives being arranged such that at least one drive is engaged regardless of the direction of motion of the carriage.

5. An energy conversion system as defined in claim 4 wherein said one way drive means comprise a plurality of pairs of one way clutches with the clutches of each pair being respectively engaged with the two flights of the belt/chain and at least two of said pairs being arranged to drive in opposite directions.

6. An energy conversion system as defined in claim 3 including means for moving said carriage in a reciprocating motion.

7. An energy conversion device as defined in claim 1 wherein said means for converting reciprocating motion to rotary motion includes means responsive to wave action for translating vertical and surge motion of the waves to linear reciprocating movement.

8. An energy conversion device as defined in claim 7 wherein said means response to wave action comprises a buoyant float, a housing containing, at least one lever arm connected at one location to said float and at another location pivotally connected to said housing and means connecting the lever arm to convert the pivotable movement of the arm to rotary motion.

9. An energy conversion system as defined in claim 1 wherein said second means comprises at least one pair of vertically aligned pulleys/sprockets and at least one endless belt/chain engaged therebetween, said weight being secured to said endless belt/chain for movement with the belt/chain along its path of travel around its associated pulleys/sprockets.

10. An energy conversion system as defined in claim 9 including an overrunning clutch engaged between said first means and one of said pulley/sprockets to impart said rotary motion to said one pulley substantially only when said weight is moving from its lowermost position to its uppermost position whereby the weight moves from approximately its uppermost to its lower position under the influence of gravity.

11. An energy conversion device as defined in claim 10 wherein said at least one endless belt and at least one pair of pulley/sprockets comprise a pair of endless belts and two pairs of vertical spaced and axially aligned pulley/sprockets respectively engaged with said belts with said weight being secured to both said belts.

12. An energy conversion system as defined in claim 1 wherein said transmission means includes a plurality of pulleys/sprockets and belts/chains connected therebetween to provide a step up transmission between said second means and said rotary generator.

13. An energy conversion system as defined in claim 12 including a centrifugal clutch means in said transmission for transmitting rotary motion to said generator only after a predetermined shaft speed is achieved while the weight is returning to its first position under the influence of gravity.

14. An energy conversion system comprising first means for generating a reciprocal motion, second means for converting said reciprocal motion to rotary motion; a weight; third means connected to said second means and driven by said rotary motion for lifting said weight in response to said rotary motion from a first position to a higher second position and for allowing said weight to return to said first position under the influence of gravity, a rotary electrical generator, and transmission means connected to said third means for driving said rotary electrical generator to creates electricity only while said weight is returning from its higher second position to said first position.

15. An energy conversion system as defined in claim 14 wherein said second means includes a carriage, means for moving said carriage in a reciprocating path of travel; a pair of spaced pulleys/sprockets respectively located adjacent the opposed ends of the path of travel of said carriage, an endless belt/chain engaged with said pulleys/sprockets and a plurality of one way drive means on said carriage and engaged with said endless belt to drive the belt in a single drive direction regardless of the direction in which the carriage is reciprocating.

16. An energy conversion system as defined in claim 15 wherein said one way drive means comprise one way mechanical drives which engage to drive the belt/chain in one predetermined direction and free wheel in the other, said one way mechanical drives being arranged such that at least one drive is engaged regardless of the direction of motion of the carriage.

17. An energy conversion system as defined in claim 16 wherein said one way drive means comprise a plurality of pairs of one way clutches with the clutches of each pair being respectively engaged with the two flights of the belt/chain and at least two of said pairs being arranged to drive in opposite directions.

18. An energy conversion system as defined in claim 17 wherein said transmission means includes means for preventing transfer of rotary motion from the third means to the generator while said weight returns from its second position to its first position.

19. An energy conversion device as defined in claim 17 wherein said first means for generating reciprocating motion includes means responsive to wave action for translating vertical motion of the waves to linear reciprocating movement.

20. An energy conversion device as defined in claim 19 wherein said means response to wave action comprises a buoyant float, a housing containing, at least one lever arm connected at one location to said float and at another location pivotally connected to said housing and means connecting the lever arm to convert the pivotable movement of the arm to rotary motion.

21. An energy conversion system as defined in claim 15 wherein said third means comprises at least one pair of vertically aligned pulleys/sprockets and at least one belt/chain engaged therebetween, said weight being secured to said endless belt/chain for movement with the belt/chain along its path of travel around its associated pulleys/sprockets.

22. An energy conversion system as defined in claim 21 including an overrunning clutch engaged between said second means and one of said pulley/sprockets to impart said rotary motion to said one pulley substantially only when said weight is moving from its lowermost position to its uppermost position whereby the weight moves from approximately its uppermost to its lower position under the influence of gravity.

23. An energy conversion device as defined in claim 22 wherein said at least one endless belt and at least one pair of pulley/sprockets comprise a pair of endless belts and two pairs of vertical spaced and axially aligned pulley/sprockets respectively engaged with said belts with said weight being secured to both said belts.

24. An energy conversion system as defined in claim 15 wherein said transmission means includes a plurality of pulleys/sprockets and belts/chains connected therebetween to provide a step up transmission between said third means and said rotary generator.

25. An energy conversion system as defined in claim 24 including a centrifugal clutch means in said transmission for transmitting rotary motion to said generator only after a predetermined shaft speed is achieved while the weight is returning to its first position under the influence of gravity.

* * * * *